Sept. 3, 1968   R. V. CLUCKER ET AL   3,399,795
LOADING APPARATUS FOR DEMOUNTABLE VEHICLE BODIES
Filed Aug. 15, 1966   5 Sheets-Sheet 1
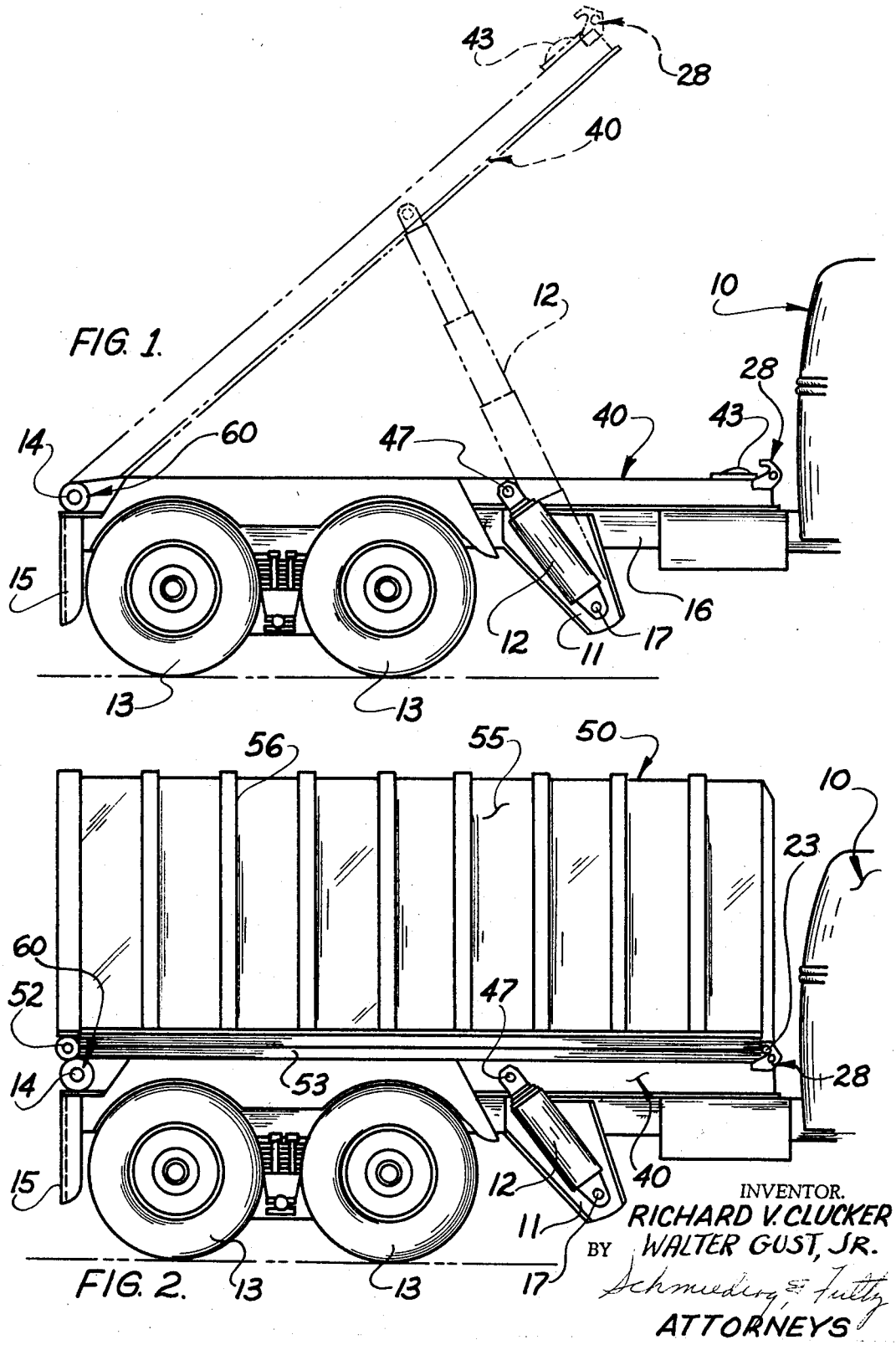
INVENTOR.
RICHARD V. CLUCKER
BY WALTER GUST, JR.
ATTORNEYS

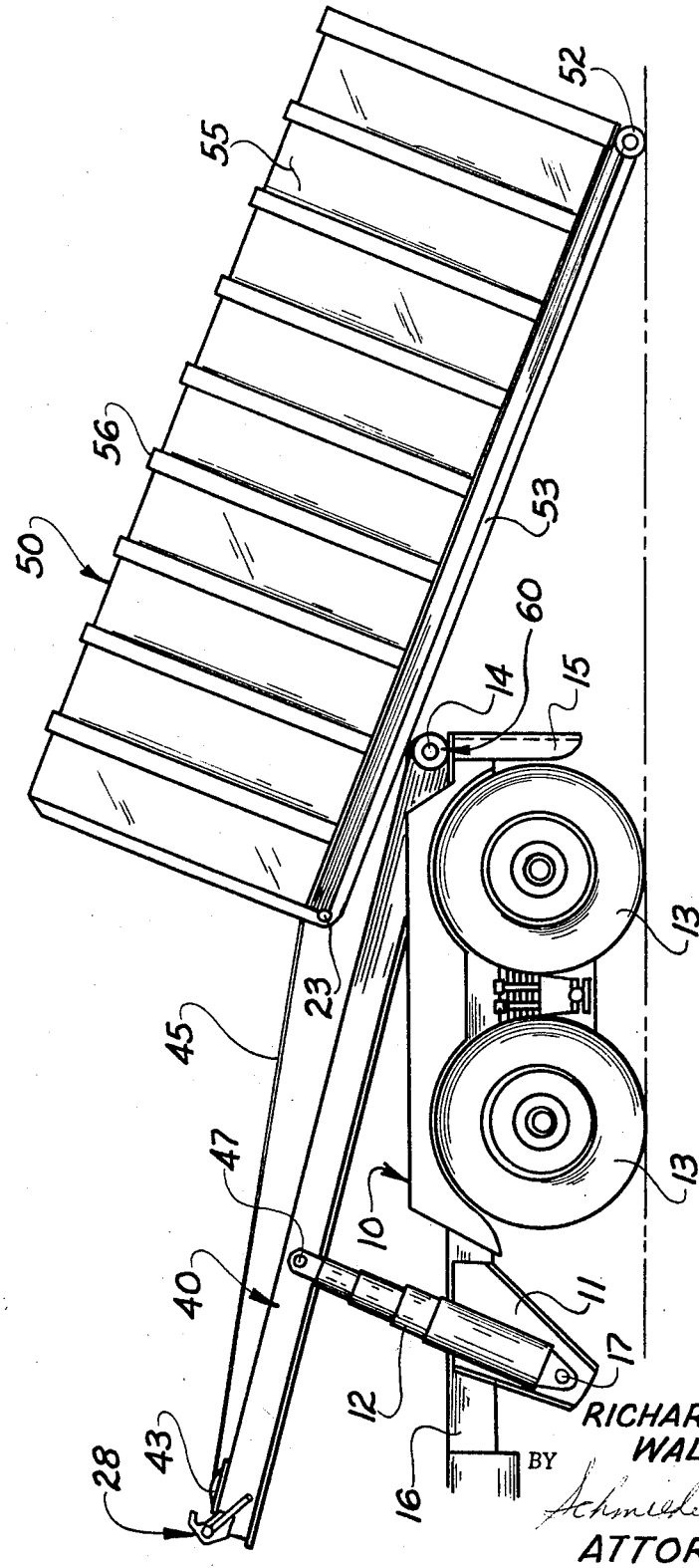

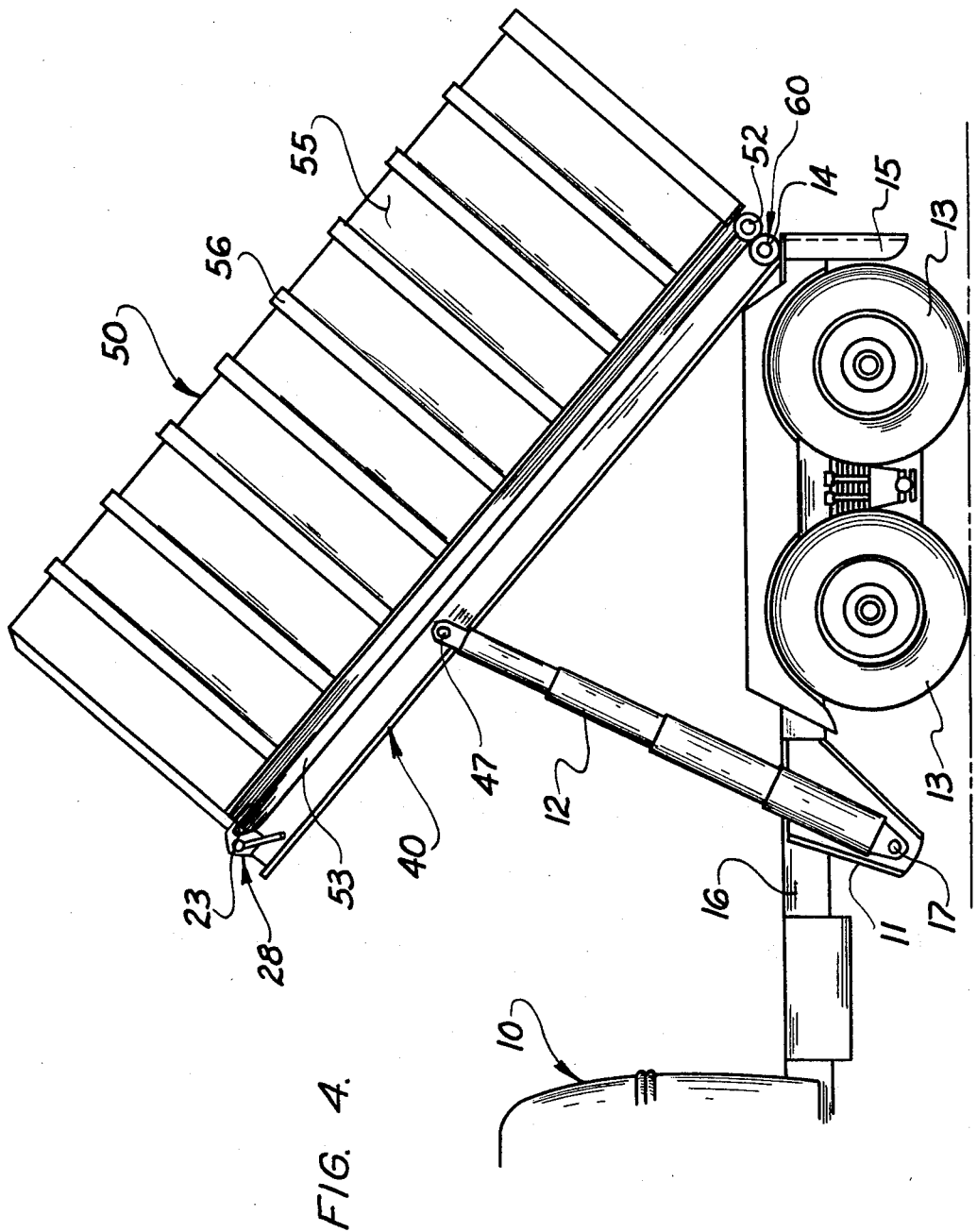

Sept. 3, 1968  R. V. CLUCKER ET AL  3,399,795
LOADING APPARATUS FOR DEMOUNTABLE VEHICLE BODIES
Filed Aug. 15, 1966  5 Sheets-Sheet 4

INVENTOR.
RICHARD V. CLUCKER
WALTER GUST, Jr.

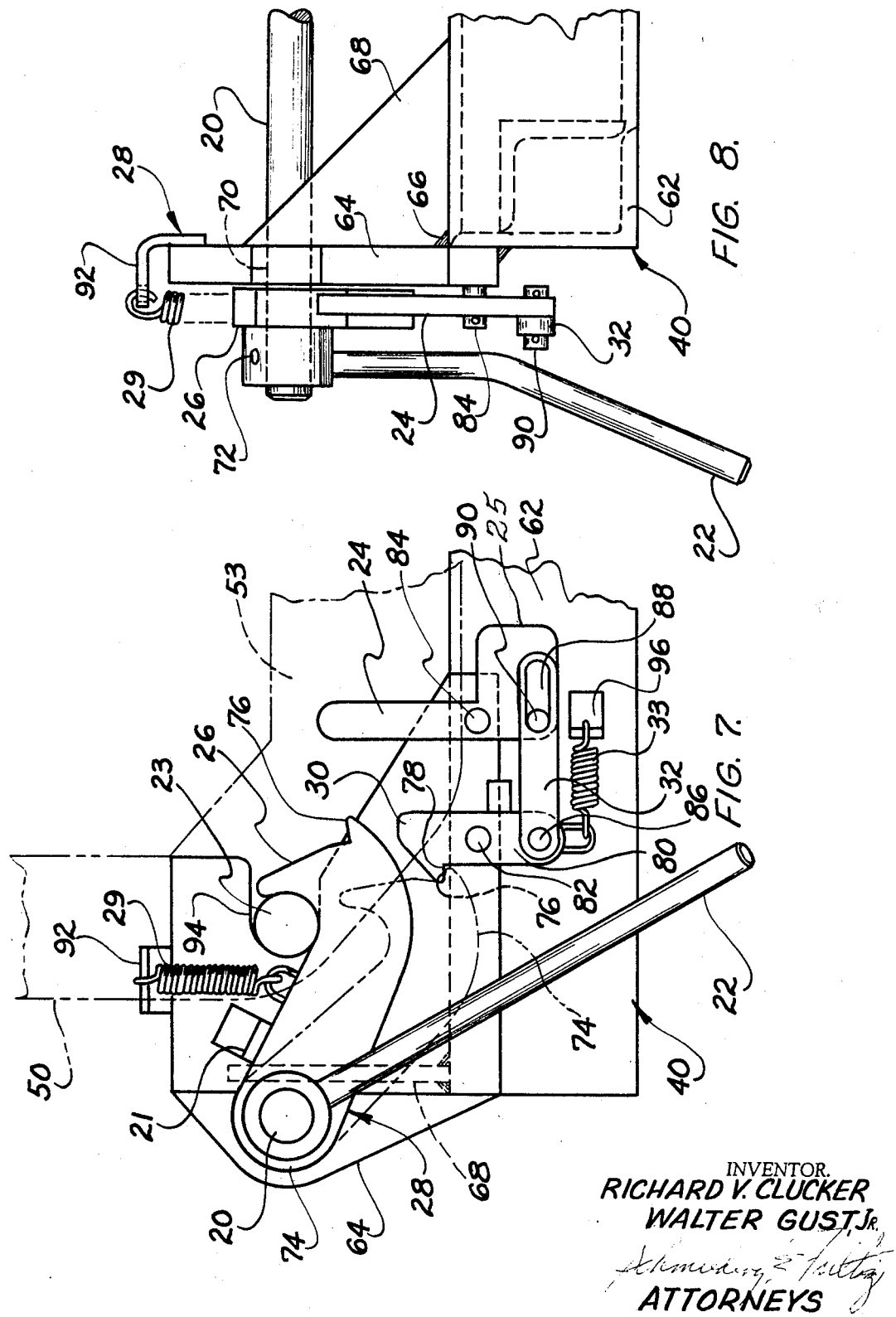

United States Patent Office 3,399,795
Patented Sept. 3, 1968

3,399,795
LOADING APPARATUS FOR DEMOUNTABLE
VEHICLE BODIES
Richard V. Clucker and Walter Gust, Jr., Kenton, Ohio,
assignors to Harsco Corporation, Harrisburg, Pa., a
corporation of Pennsylvania
Filed Aug. 15, 1966, Ser. No. 572,610
6 Claims. (Cl. 214—517)

This invention relates to loading apparatus for demountable vehicle bodies and particularly to an improved loading apparatus which may be readily attached as a unit to a conventional truck chassis and used to separately load and haul any one of a plurality of demountable bodies while the other unmounted bodies are being loaded or unloaded with freight, refuse or the like.

In general the apparatus of the present invention includes a body supporting frame means that is mounted on the truck chassis and provided with tracks for slideably receiving runners mounted on the bottoms of the bodies to be loaded and unloaded. The truck chassis is further provided with power means for sliding the body along the tracks, which power means is shown in the present application as a winch and cable mechanism adapted to drag the body onto and along the tracks.

In accordance with the present invention the body loading apparatus is provided with a novel automatic latch mechanism for locking the loaded body in its traveling position until such time as the body is to be unlatched and unloaded. Such novel latch mechanism includes a latch element on the demountable body and a cooperating cam actuated latch element mounted on the body supporting frame, the latter being disposed in the path of movement of the former. The cam actuated latch element is self-latching with the latch element on the body when engaged by it and can be unlatched and retained open for unloading by the truck operator upon actuating a lever and trigger mechanism. Such manual actuation can be accomplished either at the latch location on the frame or remotely from the truck cab by the addition of remote linkage to the lever system.

It is therefore an object of the present invention to provide an improved loading apparatus for demountable vehicle bodies which includes an automatic latching means that facilitates the loading and unloading operation.

It is another object of the present invention to provide an improved apparatus of the type described that securely and safely retains demountable vehicle bodies in their traveling position on a truck chassis.

Further objects and advantages of the present invention will be apparent from the following description, reference being had to the accompanying drawings wherein a preferred form of embodiment of the invention is clearly shown.

In the drawings:

FIG. 1 is a partial side elevational view of a truck chassis showing the body loading apparatus of the present invention mounted thereon;

FIG. 2 is a second side elevational view of the truck chassis of FIG. 1 showing a demountable truck body in mounted position on its supporting frame;

FIG. 3 is another side elevational view corresponding to FIG. 2 and 3 but showing the demountable vehicle body in a partially loaded position;

FIG. 4 is still another side elevational view corresponding to FIGS. 1–3 and showing the demountable vehicle body in an elevated position;

FIG. 7 is a side elevational view of a latch mechanism constructed in accordance with the present invention; and FIG. 8 is an end elevational view of the latch mechanism of FIG. 7.

Figure 5:
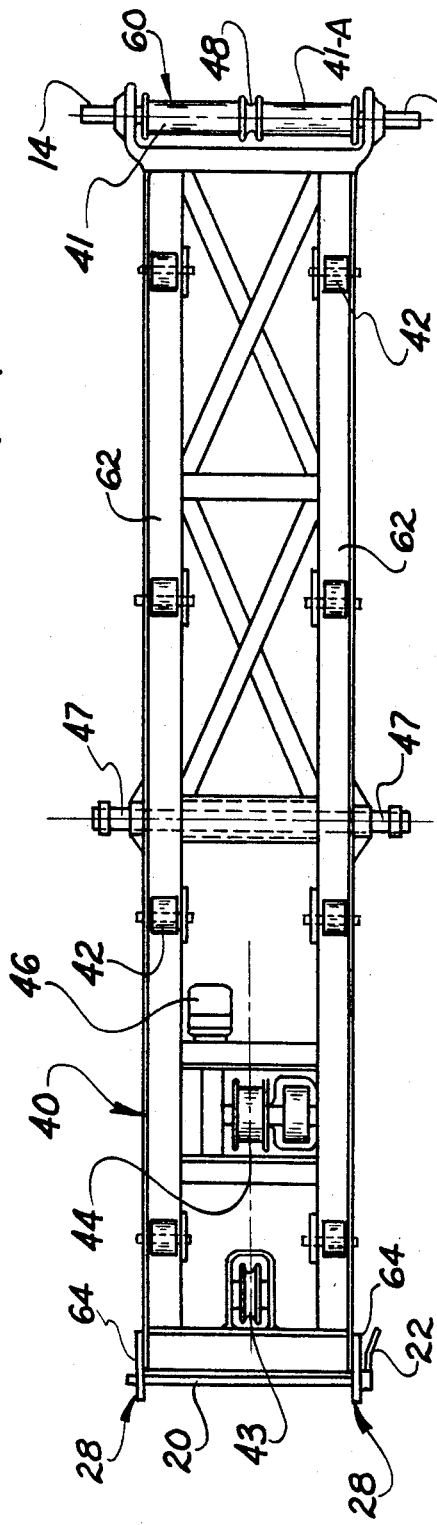
FIG. 5 is a top elevational view of a track forming frame means comprising a portion of the apparatus of the present invention.

Referring in detail to the drawings, FIGS. 1–4 illustrate a truck indicated generally at 10 that includes a chassis 16, wheels 13, and a demountable vehicle body 50 carried on a body supporting frame means 40.

With continued reference to FIGS. 1–4, the vehicle is provided with telescopic cylinders 12 for elevating frame means 40 having their lower ends pivotally connected to chassis 16 at a pivot pin 17 and their upper ends pivotally connected to body supporting frame means 40 at upper pivot 47. Telescoping cylinders 12 are hydraulically actuated to elevate frame means 40 from the position of FIG. 2 to the position of FIG. 4, said frame means being pivoted at its rear end to shaft 14.

Chassis 16 is further provided with a butt plate 15 which functions in cooperation with a winch 46 and split roller assembly 60 to lift demountable body 50 and drag it onto frame means 40.

Figure 6:
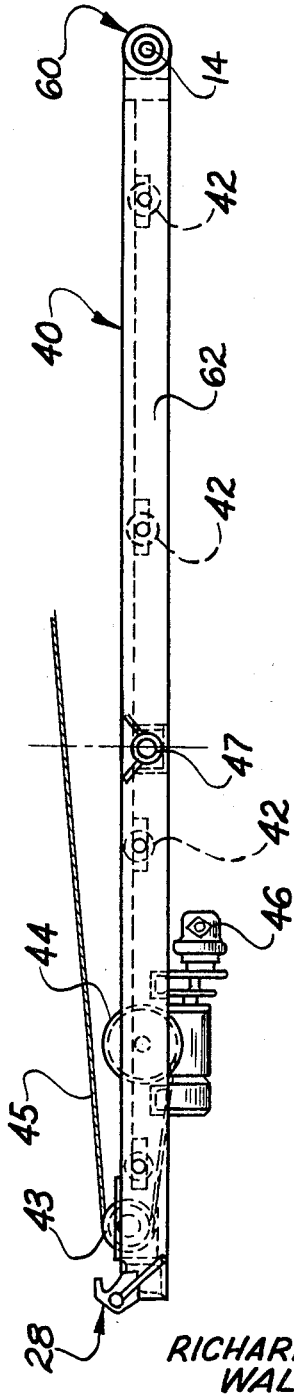
FIG. 6 is a side elevational view of the track forming frame means of FIG. 5.

With reference to FIGS. 5 and 6, winch mechanism 46 includes a drum 44 adapted to wind up a cable 45 that is extended around a forward pulley 43, the end of said cable being detachably connected to the front end of demountable body 50.

The particular demountable body 50 illustrated is a container for refuse of the type used by industrial plants and represents a typical body type. As seen in FIG. 2, body 50 includes side walls 55 and a plurality of reinforcing ribs 56. The rear end of demountable body 50 is provided with a plurality of body supporting rollers 52 which are used during the loading and unloading operations in the manner shown in FIG. 3.

Referring particularly to FIGS. 5 and 6, body supporting frame means 40 includes a pair of spaced longitudinally extending frame members 62, on which are mounted a plurality of spaced rollers 42. Such frame members and rollers form track means for receiving the runners 53 on the lower end of the demountable body 50.

Reference is next made to FIG. 7 and FIG. 8 which illustrate a novel latch mechanism indicated generally at 28 which functions to lock demountable body means 50 securely in the traveling position of FIG. 2. As seen in FIG. 5, two of these latch mechanisms 28 are used, one on each side of the body supporting frame means 40, and each latch mechanism is adapted to latch with a respective body latch element 23.

As seen in FIG. 7 and FIG. 8 each of the latch mechanisms 28 comprises a bracket 64 which is welded to the side of a respective longitudinal frame member 62 at the welds 66 and reinforced by the metal gusset 68.

A shaft 20 is rotatably journaled in holes 70 in brackets 64 and one end of the shaft is provided with an actuating handle 22 mounted on the shaft by a set screw 72.

Each latch mechanism 28 further includes a hook member 74 having an inner end welded to shaft 20 for rotation therewith and an outer end forming an inclined cam surface 26. Hook member 74 further includes a hold-open shoulder 76 adapted to latch with an other hold-open shoulder 78, the latter being formed on a lever 80 pivotably mounted on brackets 64 at pivot pins 82.

With continued reference to FIGS. 7 and 8, each latch mechanism 28 further includes a resetting trigger 24 that is pivotally mounted on a bracket 64 at a pivot pin 84, said resetting trigger being connected to pivoted lever 80 by a lost-motion link 32, one end of said link being connected to resetting trigger 24 at a pin 90 disposed in a slot 88.

Each latch mechanism 28 further includes a tension spring 29 connected between hook members 74 and a bracket 92 for biasing hook member 74 upwardly towards the latched position of FIG. 7. A stop 21 is provided for limiting the rotation of hook 74 at the position illustrated when body latch element 23 is removed from slot 94.

A second tension spring 33 is connected between the lower end of lever 80 and a bracket 96 for biasing lever 80 towards a position wherein latch shoulder 78 on the lever engages latch shoulder 76 on hook member 74.

In operation, a demountable body unit 50 is loaded from a ground supported position by first backing the truck 10 to a position wherein butt plate 15 confronts the front side of the body and by partially elevating body supporting frame means 40 to the position of FIG. 3. The operator then connects the end of cable 45 to the lower front end of the body. It should be pointed out that cable 45 is extended over the central pulley 48, FIG. 5, and down to its connection with the front lower edge of the body.

The operator next gets back into the cab of the truck and energizes the power winch 46. As the cable winds in, the front end of the body is drawn upwardly along butt plate 15 and over split roller assembly 60. Since the two sections 41 and 41-A of the split roller assembly are independently journaled on shaft 14, any misalignment of body 50 is automatically taken care of, since these split rollers permit the body to align itself as it is drawn upwardly and over the roller assembly.

With continued actuation of the winch, the container is moved forwardly along body supporting frame means 40 with skids 53 riding on rollers 42. As the body reaches its forwardmost position, the body latch elements 23 pass over resetting triggers 24 and engage cam surfaces 26 on hook members 74 and thereby open the hooks to permit entry of the body latch elements 23 into slots 94. After the body latch elements enter slots 94, tension springs 29 raise hook members 74 back into the latch position of FIG. 7.

The operator next hauls the loaded body 50 to the destination in the travel position of FIG. 2 and extends telescoping cylinders 12 to the position of FIG. 4 for the purpose of dumping the contents from the rear door of the body. The body is securely retained on frame 40, when elevated, by the latch mechanism, 28 just described.

After dumping the contents the operator returns to the site at which the body was picked up and unloads it from frame 40 to the ground. This is accomplished by releasing latch mechanism 28, either by getting out of the cab and going bcak to the manual actuator 22, or remotely from the cab in instances where remote actuating means, not illustrated, are provided. When actuator 22 is moved in a clockwise direction, FIG. 7, shaft 20 rotates and moves hook members 74 down into the position shown in dotted delineation in FIG. 7 wherein the two hold-open shoulders 76 and 78 are brought into latched engagement.

The operator next gets back into the cab and actuates telescoping cylinders 12 to elevate body supporting frame 40 to the position of FIG. 3. The winch mechanism 46 is next actuated to release cable 45 which permits demountable body 50 to slide down body supporting frame means 40 in a manner shown in FIG. 3. As the body is unloaded and body latch elements 23 move out of bracket slots 94, they engage the upper ends of resetting triggers 24 which shift lost-motion links 32 to the left, FIG. 7, thereby pivoting lever 80 and disengaging hold-open shoulders 76 and 78. This releases hook members 76 and permits tension spring 29 to return the hook members to the normal latching position of FIG. 7.

It should be mentioned that resetting triggers 24 are provided with counterweighted end portions 25 which cause the upper end of triggers 24 to return to an upright position as seen in FIG. 7.

While the form of embodiment of the present invention as herein disclosed constitutes a preferred form, it is to be understood that other forms might be adopted, all coming within the scope of the claims which follows.

We claim:
1. A loading apparatus for vehicle bodies comprising, in combination, track forming frame means; body means including supporting runner means guided by said frame means and a body latch element on the body means; power means for moving said body means longitudinally of said frame means; movable latch means on said track forming frame means and including a latch shoulder moveable between a closed position in latched engagement with said body latch element and an open position, and a cam surface for engagement by said body latch element; hold open means for retaining said movable latch means in said open position, said hold open means including a resetting trigger disposed in the path of movement of said body latch element for moving the latch means to a closed position upon discharge of the body means; and an actuator for moving said latch means from said closed position to said open position.

2. The loading apparatus defined in claim 1 wherein said hold open means comprises a pivoted lever including a first hold-open shoulder that latches with a second hold-open shoulder on said latch means, a link connecting said pivoted lever to said resetting trigger, and spring means urging said first hold-open shoulder toward a latching position with said second hold-open shoulder.

3. The loading apparatus defined in claim 1 wherein said hold-open means comprises a pivoted lever including a first hold-open shoulder that latches with a second hold-open shoulder on said latch means, means forming a lost motion connection between said pivoted lever and said resetting trigger, and means urging said first hold-open shoulder towards a latching position with said second hold-open shoulder.

4. A loading apparatus for vehicle bodies comprising, in combination, track forming frame means; body means including supporting runner means guided by said frame means and a body latch element on the body means; power means for moving said body means longitudinally of said frame means; bracket means onsaid track forming frame means; shaft means journaled on said bracket means; an actuator on said shaft means; a hook element mounted on said shaft means and including a hook shoulder engageable with said body latch element, a cam surface, and a hold-open shoulder; and hold-open means for retaining said hook element in said open position, said hold-open means including another hold-open shoulder latchingly engageable with said first mentioned hold-open shoulder, and a resetting trigger disposed in the path of movement of said body latch element for moving the hook element to a closed position upon discharge of the body means.

5. The loading apparatus defined in claim 4 wherein said other hold-open shoulder is on a pivoted lever, a link connecting said pivoted lever to said resetting trigger, and spring means urging said other hold-open shoulder toward a latching position with said first mentioned hold-open shoulder.

6. The loading apparatus defined in claim 4 wherein said other hold-open shoulder is on a pivoted lever, means forming a lost motion connection between said pivoted lever and said resetting trigger, and means urging said other hold-open shoulder towards a latching position with said first mentioned hold-open shoulder.

References Cited

UNITED STATES PATENTS

| | | | |
|---|---|---|---|
| 1,799,233 | 4/1931 | Holan | 296—35 |
| 2,424,429 | 7/1947 | Bamberg | 296—35 |
| 2,538,531 | 1/1951 | Likens | 296—35 |
| 2,508,090 | 5/1950 | Beems et al. | 292—108 XR |
| 3,195,749 | 7/1965 | Dempster et al. | 296—35 |

FOREIGN PATENTS

| | | |
|---|---|---|
| 206,495 | 6/1924 | Great Britain. |

ALBERT J. MAKAY, *Primary Examiner.*